United States Patent
Yamamoto et al.

(10) Patent No.: US 11,238,328 B2
(45) Date of Patent: Feb. 1, 2022

(54) MAGNETIC MARKER AND MAGNETIC MARKER SYSTEM (71) Applicant: AICHI STEEL CORPORATION, Tokai (JP)

(72) Inventors: Michiharu Yamamoto, Tokai (JP); Tomohiko Nagao, Tokai (JP); Hitoshi Aoyama, Tokai (JP); Koei Gemba, Tokai (JP)

(73) Assignee: AICHI STEEL CORPORATION, Aichi (JP)

(*) Notice: Subject to any disclaimer, the term of this patent is extended or adjusted under 35 U.S.C. 154(b) by 0 days.

(21) Appl. No.: 16/954,445

(22) PCT Filed: Dec. 12, 2018

(86) PCT No.: PCT/JP2018/045770
§ 371 (c)(1),
(2) Date: Jun. 16, 2020

(87) PCT Pub. No.: WO2019/124196
PCT Pub. Date: Jun. 27, 2019

(65) Prior Publication Data
US 2021/0089858 A1 Mar. 25, 2021

(30) Foreign Application Priority Data
Dec. 20, 2017 (JP) .............................. JP2017-244294

(51) Int. Cl.
G06K 7/08 (2006.01)
G06K 19/077 (2006.01)
(Continued)

(52) U.S. Cl.
CPC ........ G06K 19/07773 (2013.01); E01F 11/00 (2013.01); G06K 7/10376 (2013.01);
(Continued)

(58) Field of Classification Search
CPC ....... G05D 1/0261; G05D 1/02; B60W 50/14; B60W 30/16; G08G 1/042; G08G 1/09;
(Continued)

(56) References Cited

U.S. PATENT DOCUMENTS

2002/0065600 A1* 5/2002 Oka ........................ G08G 1/042
701/516
2002/0149493 A1* 10/2002 Yudate ..................... C08K 7/14
340/693.5
(Continued)

FOREIGN PATENT DOCUMENTS

DE 102005035342 A1 12/2006
DE 102013002366 A1 8/2014
(Continued)

OTHER PUBLICATIONS

International Search Report for corresponding Application No. PCT/JP2018/045770, dated Feb. 19, 2019.
(Continued)

Primary Examiner — Daniel St Cyr
(74) Attorney, Agent, or Firm — Renner, Otto, Boisselle & Sklar, LLP (57) ABSTRACT In a columnar-shaped magnetic marker including a magnet formed by dispersing a magnetic powder of iron oxide in a polymer material and to be laid in a road without being accommodated in a metal container, one end face of an outer peripheral surface and an entire outer peripheral side surface of magnet are covered with metal foil forming a conductive layer, and an RFID tag which performs wireless communication with a tag reader mounted on a vehicle side is arranged on the end face of magnetic marker provided with metal foil as being in a state of being electrically insulated from metal foil.

17 Claims, 10 Drawing Sheets (51) Int. Cl.
   *E01F 11/00* (2006.01)
   *G06K 7/10* (2006.01)
   *G06K 19/06* (2006.01)
   *G05D 1/02* (2020.01)
   *G08G 1/09* (2006.01)

(52) U.S. Cl.
   CPC ..... *G06K 19/06196* (2013.01); *G05D 1/0259* (2013.01); *G05D 2201/0213* (2013.01); *G08G 1/09* (2013.01)

(58) Field of Classification Search
   CPC ........ G08G 1/096783; G08G 1/096716; E01F 11/00
   USPC ....................... 235/380, 385, 462.46, 472.02
   See application file for complete search history.

(56) References Cited

U.S. PATENT DOCUMENTS

| | | |
|---|---|---|
| 2004/0090868 A1 | 5/2004 | Endo et al. |
| 2008/0084311 A1 | 4/2008 | Salzman |
| 2009/0146821 A1 | 6/2009 | Kato |
| 2010/0090833 A1 | 4/2010 | Mullis et al. |
| 2011/0017833 A1 | 1/2011 | Cullen et al. |
| 2013/0161380 A1 | 6/2013 | Joyce |
| 2013/0206847 A1 | 8/2013 | Koujima et al. |
| 2014/0247188 A1 | 9/2014 | Nakano |
| 2014/0358331 A1* | 12/2014 | Prada Gomez ...... G05D 1/0234 701/2 |
| 2016/0297436 A1* | 10/2016 | Shin ....................... G08G 1/163 |
| 2019/0155305 A1 | 5/2019 | Yamamoto et al. |

FOREIGN PATENT DOCUMENTS

| | | |
|---|---|---|
| JP | 2002-063683 A | 2/2002 |
| JP | 2005-202478 A | 7/2005 |
| JP | 2008-301390 A | 12/2008 |
| JP | 3153131 U | 8/2009 |
| JP | 2010-016886 A | 1/2010 |
| JP | 2013-034140 A | 2/2013 |
| JP | 2015-509231 A | 3/2015 |
| JP | 2015-080226 A | 4/2015 |
| WO | 2017/187879 A1 | 2/2019 |

OTHER PUBLICATIONS

Extended European Search Report corresponding application No. 18 893 066.3, dated Jul. 29, 2021.

* cited by examiner

MAGNETIC MARKER AND MAGNETIC MARKER SYSTEM

TECHNICAL FIELD

The present invention relates to a magnetic marker to be laid in a road.

BACKGROUND ART

Conventionally, a magnetic marker to be laid in a road detectably by a magnetic sensor on a vehicle side has been known (for example, refer to Patent Literature 1). By using the magnetic marker, there is a possibility that in addition to, for example, various driving assists such as automatic steering control and lane departure warning using the magnetic marker laid along a lane, automatic driving can be achieved.

CITATION LIST

Patent Literature

Patent Literature 1: Japanese Unexamined Patent Application Publication No. 2005-202478

SUMMARY OF INVENTION

Technical Problem

However, information that can be acquired by detection of a magnetic marker indicates the presence or absence of the magnetic marker, the shift amount of a vehicle in a width direction with respect to the magnetic marker, information about whether a magnetic polarity indicates the North Pole or the South Pole, and so forth. There is a problem in which the amount and type of information that can be acquired from the magnetic marker side cannot be said as sufficient.

The present invention was made in view of the above-described conventional problem, and is to provide a magnetic marker that can provide more information with high reliability.

Solution to Problem

One aspect of the present invention resides in a magnetic marker to be laid in a road, the magnetic marker including, a wireless tag including a circuit which processes information transmitted and received by wireless communication and a first antenna provided to extend electrically from the circuit, and a conductive layer provided on at least part of an outer peripheral surface of a main body forming a magnetism generation source, the conductive layer being not electrically continuous with the main body.

One aspect of the present invention resides in a magnetic marker system including the above-described magnetic marker which retains the wireless tag, wherein frequency specifications of electric waves transmitted from the wireless tag are different between the magnetic marker laid as being buried at a position deep from a road surface of the road and the magnetic marker laid as being arranged on the road surface.

Advantageous Effects of Invention

The magnetic marker according to the present invention includes the wireless tag. With the magnetic marker including the wireless tag, more information can be provided to a vehicle side by using wireless communication. In this magnetic marker, the conductive layer with conductivity is formed on at least part of the outer peripheral surface of the main body. The conductive layer functions as an external antenna of the wireless tag and effectively acts to improve reliability of wireless communication.

In the magnetic marker system according to the present invention, there are a buried magnetic marker and a magnetic marker arranged on the road surface. Between the buried magnetic marker and the magnetic marker arranged on the road surface, there is a difference as to whether a burying material such as, for example, resin or asphalt, is included in a route of electric waves transmitted from the wireless tag. If the burying material is present in the route of electric waves, a shift phenomenon, in which the frequency of passing electric waves is shifted can occur due to a difference between the permittivity of the burying material and the permittivity of air, or the like. If the frequency of electric waves transmitted from the wireless tag is set in view of the occurrence of this shift phenomenon, reliability of transmission between the wireless tag and the counterpart can be improved.

DESCRIPTION OF EMBODIMENTS

Embodiments of the present invention are specifically described by using the following examples.

First Embodiment

The present embodiment is an example regarding magnetic marker 1 including RFID (Radio Frequency IDentification, wireless tag) 2. Details of this are described by using FIG. 1 to FIG. 10.

Magnetic marker 1 is a marker for a road to be arranged, for example, along the center of a lane. Magnetic marker 1 is used for various vehicle controls such as, for example, lane departure warning, lane keep assist, and automatic driving. Magnetic marker 1 of FIG. 1 exemplarily depicted has a columnar shape having a diameter (D) of 20 mm and a height (H) of 28 mm. In this magnetic marker 1, sheet-shaped RFID tag 2 is arranged and laminated on one end face of columnar magnet 10 forming a main body.

Figure 2:
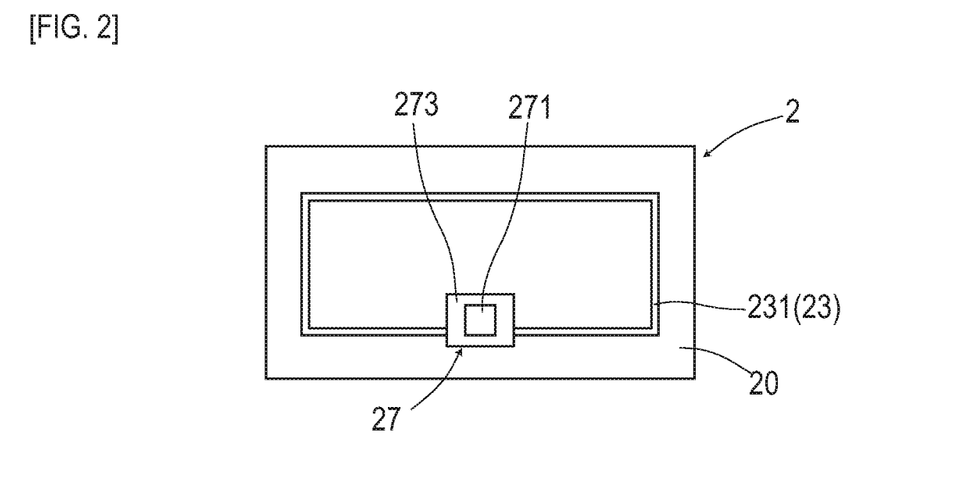
FIG. 2 is a diagram depicting an RFID tag.

First, RFID tag 2 is, as in FIG. 2, an electronic part with IC (Integrated Circuit) chip 27 mounted on a surface of tag sheet 20, which is a sheet-shaped member. RFID tag 2 is configured to operate by electric power externally supplied by wireless transmission and to wirelessly transmit information stored in IC chip 27.

Tag sheet 20 is a sheet-shaped member cut out from a PET (PolyEthylene Terephthalate) film. On the surface of tag sheet 20, antenna pattern 231 is formed, which is a conductive-ink printed pattern formed of silver paste. Antenna pattern 231 has a loop shape with a notch, and a chip arrangement region (not depicted) for arranging IC chip 27 is formed at a notched portion. When IC chip 27 is jointed to tag sheet 20, antenna pattern 231 is electrically connected to IC chip 27. With this, antenna 23 formed by antenna pattern 231 becomes in a state of electrically extending from IC chip 27 forming a circuit for processing information transmitted and received via wireless communication.

Antenna (first antenna) 23 formed by antenna pattern 231 has both of a role as power-feeding antenna where an exciting current is generated by electromagnetic induction from outside and a role as a communication antenna for wireless transmission of information. Note that as a conductive ink for printing antenna pattern 231, it is possible to use, in addition to silver paste, graphite paste, silver chloride paste, copper paste, nickel paste and so forth. Furthermore, it is also possible to form antenna pattern 231 by copper etching or the like.

IC chip 27 is an electronic part with semiconductor element 271 including a ROM (Read Only Memory) and a RAM (Random Access Memory) as memory means and so forth mounted on the surface of sheet-shaped base material 273. RFID tag 2 is fabricated by affixing this IC chip 27 onto the surface of the above-described tag sheet 20. To affix IC chip 27 of an interposer type provided with an electrode not depicted, various jointing methods can be adopted such as ultrasonic jointing, or swaging jointing in addition to a conductive bonding material.

As tag sheet 20 and base material 273 described above, a resin film made of polyethylene (PE), polyethylene terephthalate (PET), polypropylene (PP), or the like, paper, or the like can be adopted. The above-described IC chip 27 may be semiconductor element 271 itself or a chip with semiconductor element 271 packaged by a plastic resin or the like.

Magnet 10 (FIG. 1) forming the main body (magnetism generation source) of magnetic marker 1 is an isotropic ferrite plastic magnet formed by dispersing a magnetic powder of iron oxide as a magnetic material in a polymer material (non-conductive material) as a base material. Magnet 10 with magnetic powder dispersed in the non-conductive polymer material has an electrical characteristic of a low electrical conductivity and a magnetic characteristic of a maximum energy product (BHmax)=6.4 kJ/m$^3$.

Figure 1:
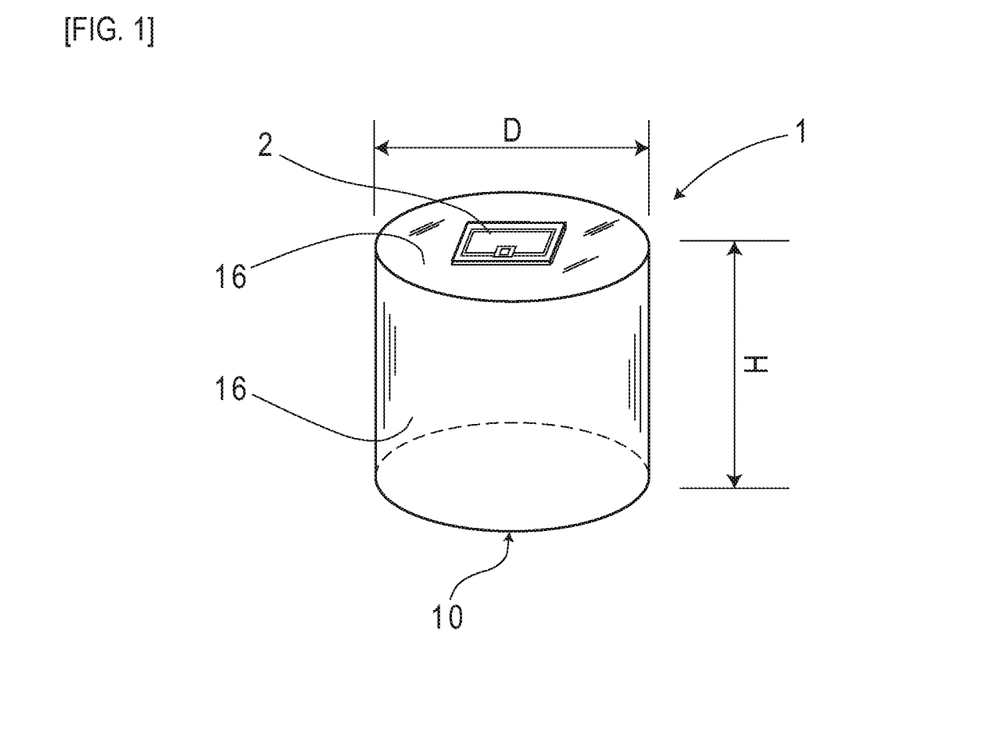
FIG. 1 is a diagram depicting a magnetic marker.

Magnetic marker 1 including this magnet 10 has a magnetic flux density Gs of the surface of 45 mT (millitesla). The magnetic flux density of 45 mT is equal to or smaller than the magnetic flux density of the surface of, for example, a magnetic sheet for use as being affixed to a white board in an office or the like, a door of a refrigerator at home, or the like.

Part of the outer peripheral surface of magnet 10 is covered with metal foil 16 forming one example of a conductive layer with conductivity. This metal foil 16 is made of aluminum and has a thickness of 0.03 mm. As described above, since magnet 10 has a low electrical conductivity, metal foil 16 is in a state of being not electrically continuous with the main body of magnet 10.

Figure 3:
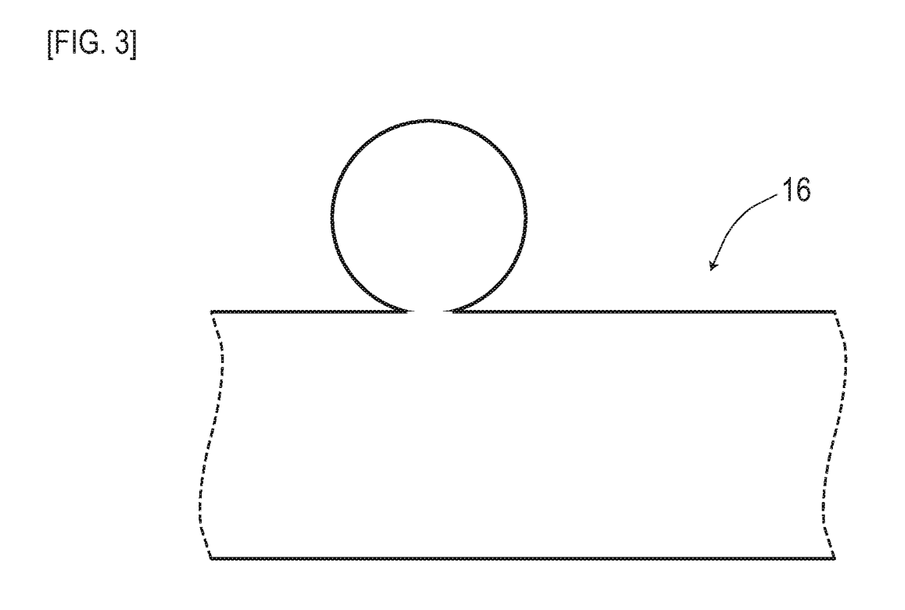
FIG. 3 is a diagram depicting a developed shape of a metal foil.

To clarify a range where a conductive layer is formed by metal foil 16, the shape of metal foil 16 developed on a plane is depicted in FIG. 3. In the drawing, a cylindrical portion corresponding to the outer peripheral side surface of the magnetic marker 1 is depicted, with one portion in a circumferential direction being cut by a broken line. As in the drawing, in magnetic marker 1, the conductive layer by metal foil 16 is formed over one end face and the entire outer peripheral side surface of magnet 10 forming a columnar shape. The above-described RFID tag 2 is arranged and laminated on the end face of magnet 10 provided with metal foil 16.

Figure 4:
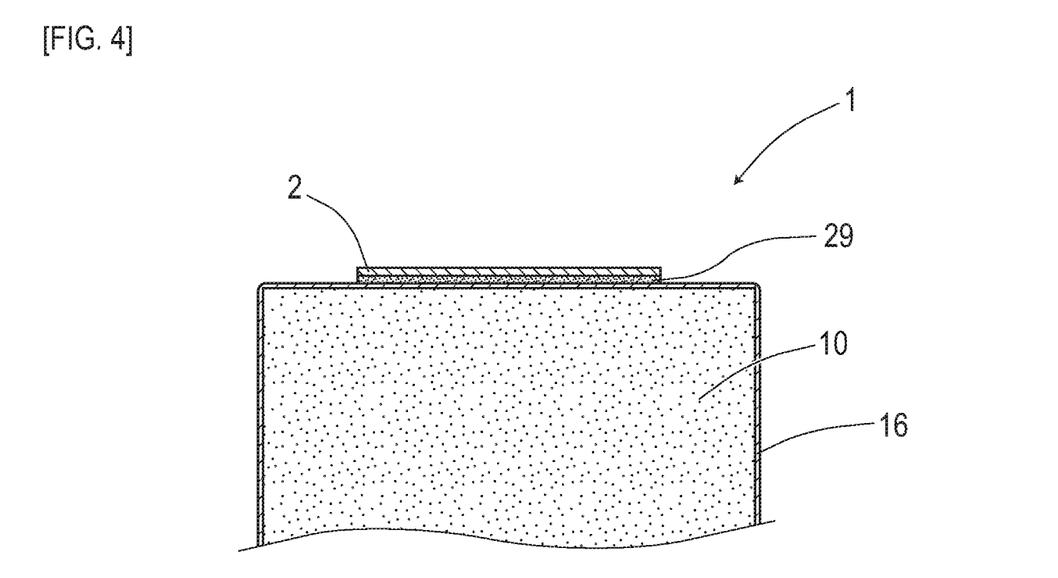
FIG. 4 is a sectional diagram depicting an attachment structure of the RFID tag.

RFID tag 2 in magnetic marker 1 is arranged on the end face of magnet 10 forming the main body, in a state of having resin-made, sheet-shaped spacer 29 interposed therebetween as in FIG. 4. Metal foil 16 covering the outer peripheral surface of magnet 10 and RFID tag 2 are in a state of being electrically insulated by resin-made spacer 29 forming one example of a plate-shaped intermediate member.

Figure 5:
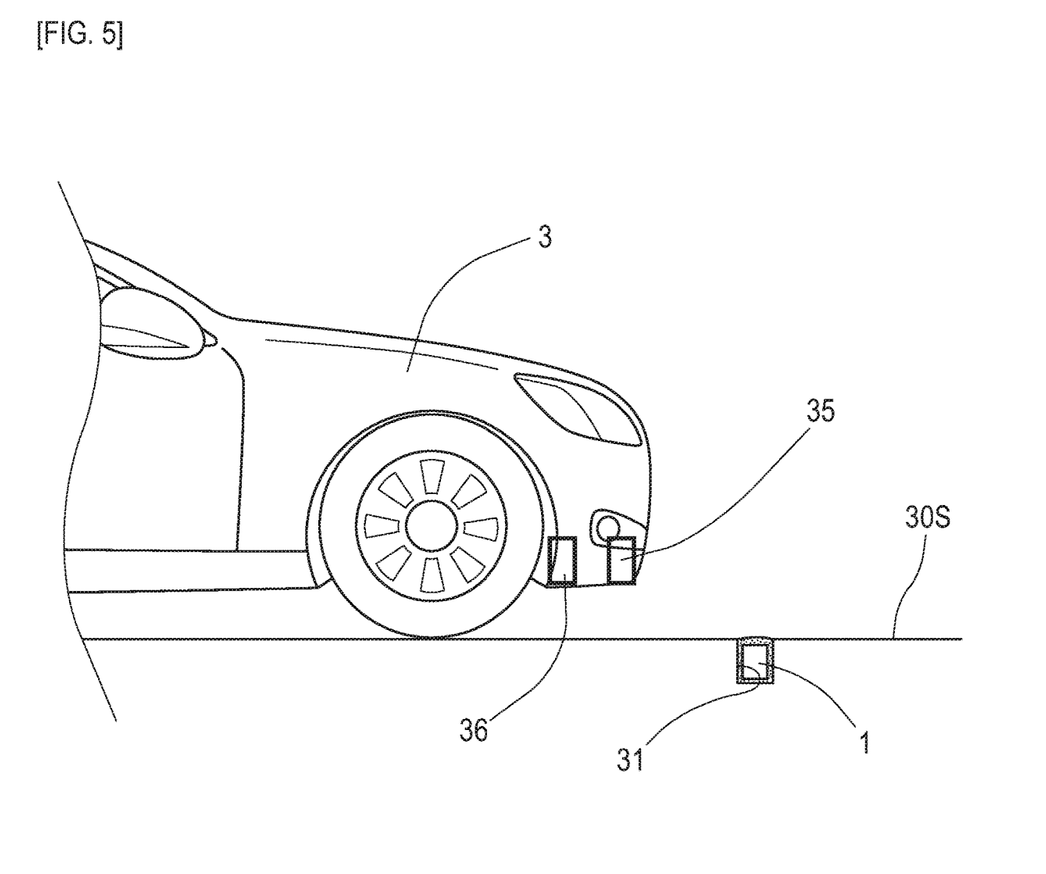
FIG. 5 is a diagram depicting a laying mode of the magnetic marker.
Figure 6:
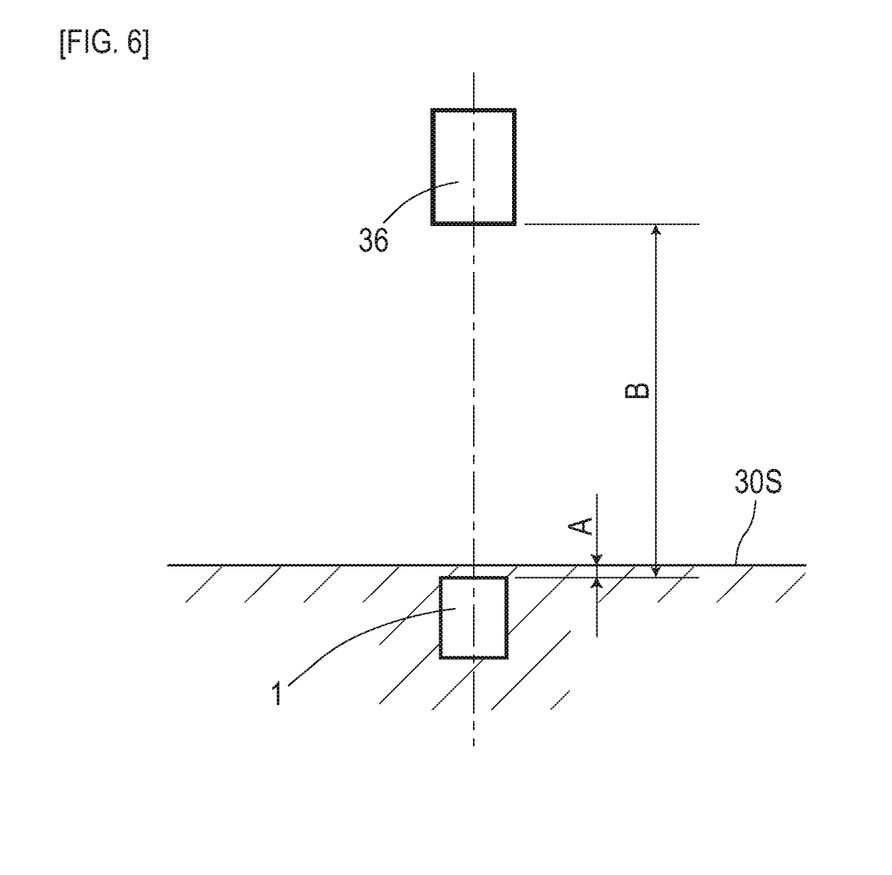
FIG. 6 is a descriptive diagram of a communication distance.

The above-described magnetic marker 1 is laid in a state of being accommodated in, for example an accommodation hole 31 bored in a road surface 30S, as in FIG. 5. Magnetic marker 1 laid in this manner makes magnetism act exceeding 8 µT in a height range from 100 mm to 250 mm assumed as an attachment position of magnetic sensor 35 on vehicle 3 side. The magnetism exceeding 8 µT can be measured with high reliability by, for example, an MI (Magneto Impedance) sensor having a measurement range of magnetic flux density of ±0.6 mT and achieving high sensitivity on the order of 0.02 µT as a magnetic flux resolution in the measurement range, or the like.

In this magnetic marker 1, metal foil 16 covering the outer peripheral surface of magnet 10 is coupled with antenna 23 (FIG. 2) of RFID tag 2 by electrostatic coupling, electromagnetic coupling, or the like in an electrically non-contact state, and acts so as to amplify electric waves at antenna 23. That is, in magnetic marker 1, metal foil 16 covering the outer peripheral surface of magnet 10 can act as an external antenna of RFID tag 2. Metal foil 16 is useful in improving reliability of wireless communication between tag reader (one example of a reader device) 36 on vehicle 3 side acquiring information from RFID tag 2 and RFID tag 2. Note that while magnetic sensor 35 and tag reader 36 are depicted as separate bodies in FIG. 5, magnetic sensor 35 and tag reader 36 may be integrated as a unit.

Here, to signify an advantageous communication characteristic of magnetic marker 1 of the present embodiment, a comparison results with the magnetic marker without metal foil 16 are depicted in Table 1.

TABLE 1

| | COMMUNICATION DISTANCE AS A SINGLE BODY | COMMUNICATION DISTANCE UNDER BURIED STATE |
|---|---|---|
| MAGNETIC MARKER (WITH METAL FOIL) | 0.60 m | 0.51 m |
| MAGNETIC MARKER (WITHOUT METAL FOIL) | 0.53 m | 0.08 m |

In Table 1, a distance B (FIG. 6) where tag reader 36 positioned in a vertical direction above the magnetic marker can communicate with an error rate smaller than 1% is indicated as a communication distance. And, a comparison regarding the above-described communication distance is indicated between a state in which the magnetic marker is buried so that a distance A (FIG. 6) from road surface 30S to the upper end face is 10 mm (buried state) and a single-body state.

As evident from Table 1, as for the magnetic marker in the single-body state without being buried in asphalt forming road surface 30S, a sufficient communication distance can be achieved with respect to the attachment height of the magnetic sensor of 100 mm to 250 mm in the vehicle, irrespective of the presence or absence of metal foil 16. On the other hand, in the state of being buried in road surface 30S, the communication distance of the magnetic marker without the metal foil 16 is significantly short. By contrast, magnetic marker 1 of the present embodiment including metal foil 16 can keep the communication distance even in the buried state.

In this manner, in magnetic marker 1 of the present embodiment with the outer peripheral surface covered with metal foil 16, even in the state of being buried in road surface 30S, the degree of impairing the communication characteristic of RFID tag 2 is small. Magnetic marker 1 of the present embodiment with RFID tag 2 attached thereto can perform communication with vehicle 3 side with high reliability and can provide more information to the vehicle side.

Note that in magnetic marker 1, resin-made spacer 29 is arranged between the end face of magnet 10 and RFID tag 2 (refer to FIG. 4) and metal foil 16 and RFID tag 2 are in a state of not making electrical contact with each other. In place of this configuration, a configuration in which antenna 23 of RFID tag 2 and metal foil 16 make electrical contact with each other may be adopted. Here, the electrical contact state refers to a state in which, for example, antenna 23 makes contact with metal foil 16 directly or indirectly via a conductor and the direct-current resistance therebetween becomes almost zero. On the other hand, an electrical non-contact state refers to a state in which, for example, antenna 23 does not make contact with metal foil 16 and the direct-current resistance therebetween is sufficiently large.

Figure 7:
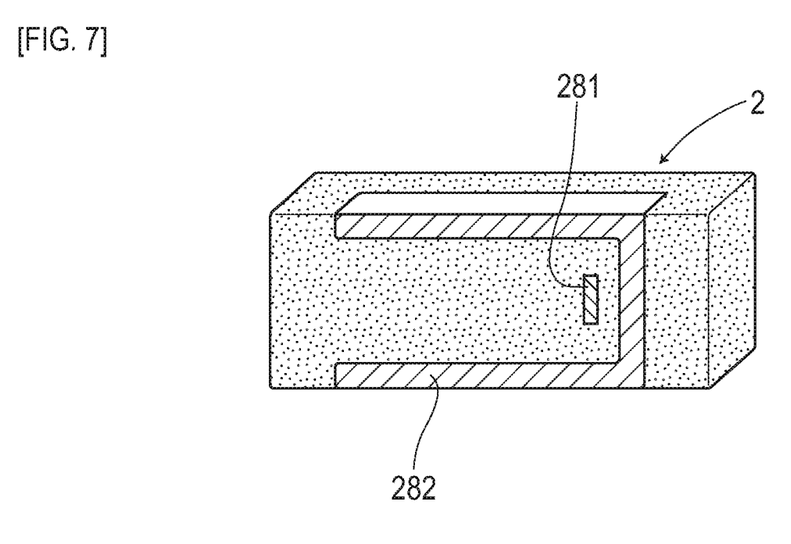
FIG. 7 is a perspective diagram depicting a sectional structure of another RFID tag.
Figure 8:
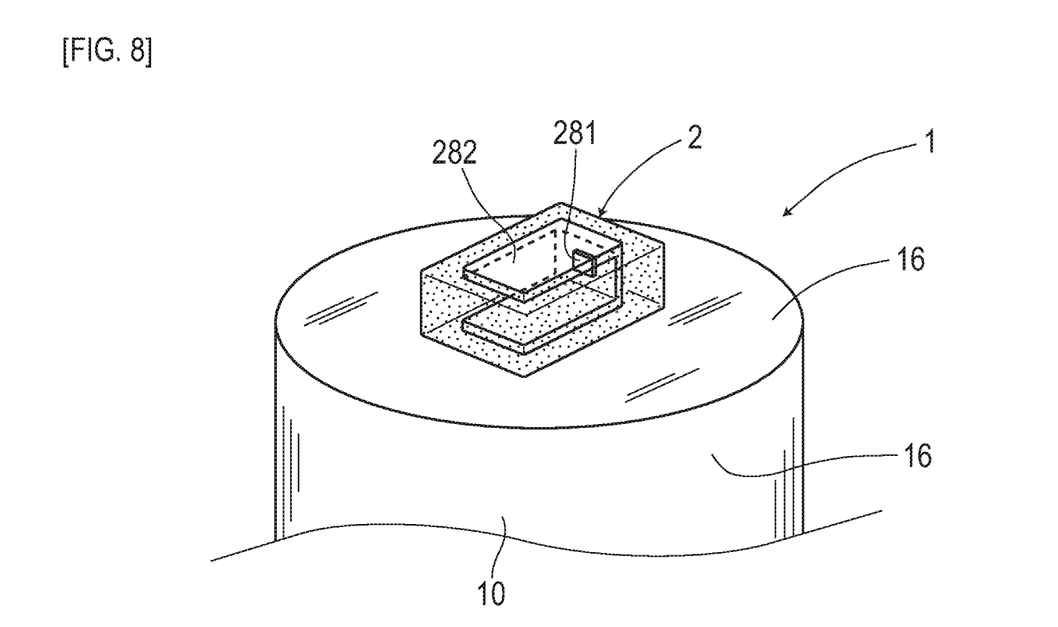
FIG. 8 is a perspective diagram depicting another magnetic marker.

Note that, as RFID tag 2, as in FIG. 7 and FIG. 8, a tag with antenna 282 (second antenna) having a U-shaped cross section retained in resin may be used. Antenna 282 having a U-shaped cross section is processed by, for example, folding a metal-made, strap-like flat plate into a U shape. RFID tag 2 of the drawing is created by, for example, insert molding of injecting a resin material into the perimeter of antenna 282 for curing, or the like. In this RFID tag 2, the state is such that metal surfaces of antenna 282 are exposed on both front and back surfaces. Furthermore, in this RFID tag 2, sheet-shaped tag 281 is retained in resin so as to face a U-shaped inner bottom surface (inner peripheral surface) formed by the antenna 282. Tag 281 has an IC chip mounted on the surface of the tag sheet and is provided with an antenna pattern, and is similar in configuration to the RFID tag exemplarily depicted in FIG. 2.

In RFID tag 2 of FIG. 7 and FIG. 8, a gap is provided between tag 281 and antenna 282, which are in a state of not making electrical contact with each other via resin and being electrically insulated from each other. In this RFID tag 2, an antenna (antenna electrically extended from the IC chip forming a circuit) incorporated in tag 281 is coupled to the antenna 282 having a U-shaped cross section by electrostatic coupling, electromagnetic coupling, or the like in an electrically non-contact state. Antenna 282 relays electric waves transmitted and received by the antenna of tag 281 and functions as an antenna which amplifies the electric waves to enhance radio field intensity.

As in FIG. 7 and FIG. 8, this RFID tag 2 is attached to the end face of magnet 10 forming the main body via the surface where the metal surface of antenna 282 having a U-shaped cross section is exposed. On the end face of magnet 10 forming the attachment surface of RFID tag 2, metal foil 16 is formed, and antenna 282 having a U-shaped cross section is in a state of making electrical contact with metal foil 16. Therefore, in magnetic marker 1 of FIG. 8, metal foil 16 together with antenna 282 functions as an external antenna of the antenna incorporated in tag 281. Note that as the arrangement position in RFID tag 2, it is only required that tag 281 be positioned on the inner perimeter of antenna 282 having a U-shaped cross section. Sheet-shaped tag 281 may be retained so as not to face the U-shaped bottom surface formed by antenna 282 but to face either one of its inner peripheral surfaces facing each other. Furthermore, sheet-shaped tag 281 may be retained so as to be orthogonal to the U-shaped bottom surface and also orthogonal to the inner peripheral surfaces facing each other.

Furthermore, as for RFID tag 2 depicted in FIG. 7 and FIG. 8 in which a gap is provided between tag 281 and antenna 282, which are both in an electrically insulated state via resin, the antenna incorporated in tag 281 and antenna 282 may be electrically contacted with each other. In this case, the antenna incorporated in tag 281 makes electrical contact with metal foil 16 via antenna 282.

While RFID tag 2 is arranged on the end face of magnetic marker 1 covered with metal foil 16 in the present embodiment, RFID tag 2 may be arranged on the outer peripheral side surface of magnetic marker 1. In this case, RFID tag 2 is preferably arranged on a portion of the outer peripheral side surface of magnetic marker 1 covered with the metal foil. Furthermore, RFID tag 2 may also be preferably buried inside magnet 10 by insert molding or the like. Also in this case, metal foil 16 provided on the outer periphery of magnet 10 can act as an external antenna of RFID tag 2.

Figure 9:
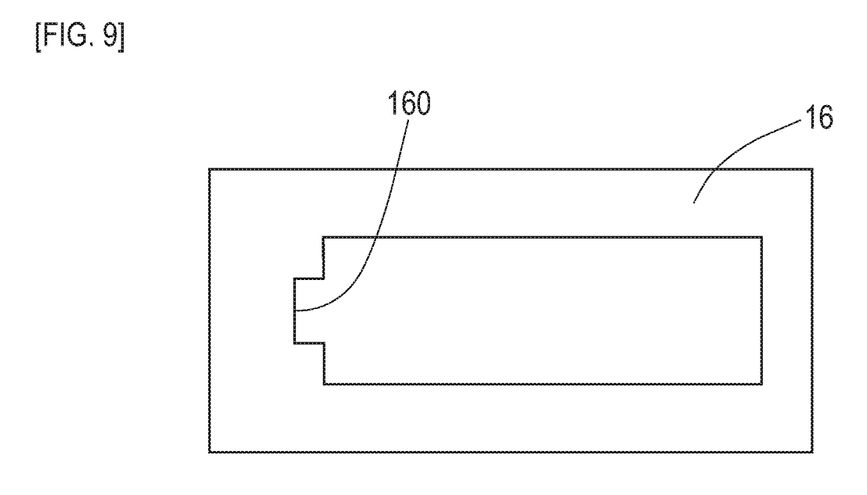
FIG. 9 is a diagram depicting another developed shape of the metal foil.
Figure 10:
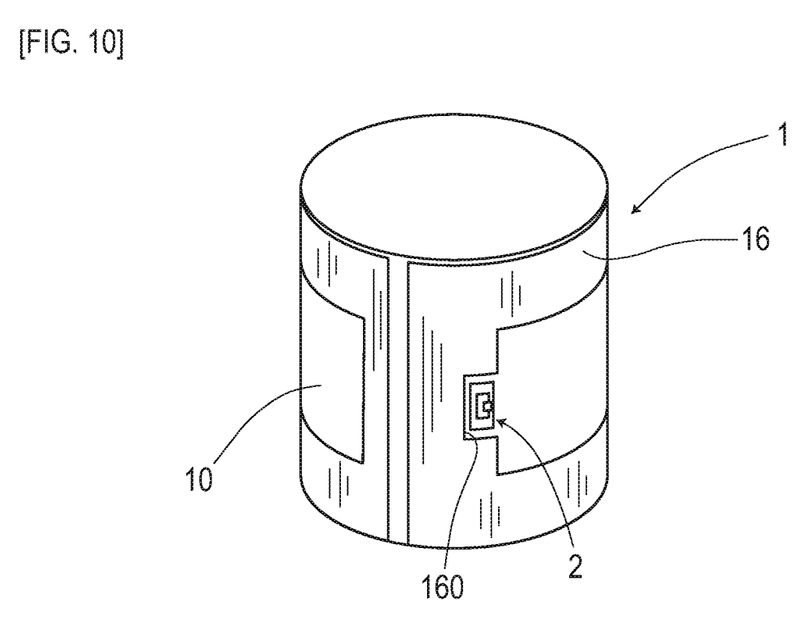
FIG. 10 is a perspective diagram depicting another magnetic marker.

While magnetic marker 1 with one end face and the outer peripheral side surface covered with the metal foil 16 is exemplarily described in the present embodiment, metal foil 16 of FIG. 9 having a loop shape may also be wound around the outer peripheral side surface of magnet 10 forming the main body as in FIG. 10. In magnetic marker 1 with metal foil 16 of FIG. 9 wound around the outer peripheral side surface, RFID tag 2 having an antenna incorporated therein is preferably arranged on an inner peripheral side of loop-shaped metal foil 16. In this case, metal foil 16 is coupled to the antenna incorporated in RFID tag 2 by electrostatic coupling, electromagnetic coupling, or the like, and metal foil 16 functions as an external antenna of RFID tag 2.

Note that to arrange RFID tag 2 on the inner peripheral side of loop-shaped metal foil 16, RFID tag 2 is preferably brought close to metal foil 16. By bringing it close, the degree of coupling between metal foil 16 forming a conductive layer and the antenna incorporated in RFID tag 2 can be increased, and wireless communication sensitivity of RFID tag 2 can be improved. Furthermore, it is also preferable that part of an inner peripheral edge part of loop-shaped metal foil 16 is dented to an outer peripheral side to form recessed part 160 and RFID tag 2 is arranged in this recessed part 160. With RFID tag 2 arranged in the recessed part 160 in this manner, the antenna incorporated in this RFID tag 2 can be surrounded by metal foil 16. In this case, of the outer perimeter of the antenna incorporated in RFID tag 2, a ratio of a portion close to metal foil 16 forming a conductive layer can be increased. If this ratio can be increased, the degree of coupling between metal foil 16 and the antenna incorporated in RFID tag 2 can be enhanced.

While the structure in the present embodiment is such that spacer 29 is interposed between RFID tag 2 and metal foil 16 covering magnetic marker 1, spacer 29 may be omitted. In this case, RFID tag 2 is arranged so that not the surface where IC chip 27 is mounted but the back surface on a tag sheet 20 side makes contact with the metal foil 16. Tag sheet 20 of RFID tag 2 is formed of a PET film or the like with a low electrical conductivity. If the mount surface of IC chip 27 is set outside as described above, the electrically insulated state between metal foil 16 and RFID tag 2 can be kept.

While magnetic marker 1 exemplarily depicted has a columnar shape, a sheet-shaped thin magnetic marker may be used. As for the sheet-shaped magnetic marker, it is preferable that metal foil 16 is formed on at least part of the surface and RFID tag 2 is arranged on a surface side of that metal foil 16.

While it is easy for, by way of example, columnar-shaped magnetic marker 1 or the like, to adopt a laying mode of being buried at a position deep from the road surface forming a surface of a road, it is easy for the sheet-shaped magnetic marker to adopt a laying mode of being arranged on the road surface by being affixed to or placed on the road surface, or the like. Meanwhile, when the magnetic marker is buried, in a route of electric waves from RFID tag 2 to tag reader 36, a medium is present, such as resin or asphalt (pavement material) for the magnetic marker to be buried. In this case, there is a possibility of occurrence of a shift phenomenon in which the frequency of passing electric waves is shifted due to, for example, a difference between the permittivity of the medium such as resin or asphalt and the permittivity of air. On the other hand, if the magnetic marker is affixed to the road surface or the like, the medium such as resin or asphalt is hardly present in the route of electric waves, and thus the fear of the frequency shift phenomenon as described above is less. Therefore, if the frequency specifications (specifications of frequency of electric waves such as carrier waves) of RFID tag 2 and tag reader 36 are the same irrespective of whether the frequency shift phenomenon tends to occur because the magnetic marker is buried in the road surface or the magnetic marker is arranged on the road surface and has less fear of the shift phenomenon, there is a fear that a difference in frequency of electric waves received by the tag reader 36 may occur or a difference in frequency of electric waves received by the RFID tag 2 may occur.

Thus, a magnetic marker system is preferable in which a buried magnetic marker and a magnetic marker arranged on the road surface have different specifications of electric waves, such as specifications of frequency (carrier frequency) of carrier waves when RFID tag 2 wirelessly transmits information or specifications of carrier frequency when electric power is fed to RFID tag 2. As for the buried magnetic marker, in consideration of the above-described frequency shift phenomenon, the frequency of electric waves (such as carrier waves) transmitted from RFID tag 2 is preferably set to be shifted by the shift amount of the frequency. Also, on a tag reader 36 side, the carrier frequency when operating power is transmitted (power supply by wireless communication) is preferably set to be shifted by the shift amount of the frequency. If the frequency of carrier waves is shifted by the amount of the shift phenomenon, the error rate when information is transmitted can be reduced, and power transmission efficiency can be improved.

It is also preferable, for example, that code information indicating whether the magnetic marker is a buried magnetic marker or a magnetic marker arranged on the road surface is included in information to be transmitted from RFID tag 2. For example, for a head magnetic marker (positioned on the most upstream side in the traveling direction of the vehicle) in a buried section where magnetic markers are buried or in a road-surface arrangement section where magnetic markers are arranged on the road surface, an RFID tag which transmits code information indicating the head of the buried section or the road-surface arrangement section may also be combined. Furthermore, for example, information identifying whether the section is a buried section where magnetic markers are buried or a road-surface arrangement section where magnetic markers are arranged on the road surface may also be included in a map database included in the vehicle side or the like.

Tag reader 36 is preferably provided with, for example, a frequency switching part which selectively sets any of carrier frequencies of a plurality of types. When the magnetic marker is identified as a buried magnetic marker or a magnetic marker arranged on the road surface or the section is identified as the above-described buried section or road-surface arrangement section, tag reader 36 preferably switches the carrier frequency at the time of power transmission.

When the setting of the frequency (frequency specifications) is changed in accordance with the laying mode of the magnetic marker, the above-described adverse effect due to the shift phenomenon can be avoided before it happens. In this case, the difference in reception frequency of electric waves due to the difference in laying mode as to whether the magnetic marker is a buried magnetic marker or a magnetic marker arranged on the road surface can be brought close to zero. As described above, this difference in reception frequency is a difference in frequency of electric waves (carrier waves) received by tag reader 36 side, a difference in frequency of electric waves (carrier waves) received by RFID tag 2 side, or the like.

Note that the laying mode of the magnetic marker is not limited to the above. A columnar-shaped magnetic marker may be placed or the like on the road surface, or a sheet-shaped magnetic marker may be buried in the road surface.

Furthermore, the degree of the above-described shift phenomenon varies in accordance with the burying depth of the magnetic marker and the type of a burying material. Thus, buried-type magnetic markers of a plurality of types with different settings of the frequency of transmission electric waves may be prepared in accordance with the burying depth and the burying material.

While the conductive layer by metal foil 16 is provided directly on the outer peripheral surface of magnet 10 forming the main body in the present embodiment, a resin layer made of a resin material may be provided on the outer periphery of magnet 10 and a conductive layer may be further provided on the outside of the resin layer. Alternatively, the outer periphery of magnet 10 provided with metal foil 16 forming a conductive layer is coated with a resin material and RFID tag 2 may be arranged on the surface of the coating layer.

In place of the conductive layer formed of metal foil 16, a conductive layer may be formed by metal plating. That is, the conductive layer may be a plated layer formed by metal plating.

The magnetic marker may have a magnet accommodated in a metal container. In this case, a coating layer made of a resin material is preferably provided on the outer perimeter of the metal container. If a conductive layer (such as metal foil) is formed on the outer periphery of this coating layer, an electrical contact between the metal container forming the main body of the magnetic marker and the conductive layer is avoided, and a state in which both do not have electrical continuity can be achieved.

In the foregoing, specific examples of the present invention are described in detail as in the embodiments, these specific examples merely disclose examples of technology included in the scope of claims for patent. Needless to say, the scope of claims for patent should not be restrictively construed based on the configuration, numerical values and so forth of the specific examples. The scope of claims for patent includes techniques acquired by variously modifying, changing, or combining as appropriate the above-described specific examples by using known techniques, knowledge of a person skilled in the art and so forth.

REFERENCE SIGNS LIST 1 magnetic marker
10 magnet (main body)
16 metal foil (conductive layer)
2 RFID tag (wireless tag)
20 tag sheet
23 antenna
231 antenna pattern
27 IC chip (circuit)
29 spacer (intermediate member)
3 vehicle
31 accommodation hole
35 magnetic sensor
36 tag reader
30S road surface

The invention claimed is:

1. A magnetic marker to be laid in a road, the magnetic marker comprising:
a wireless tag including a circuit which processes information transmitted and received by wireless communication and a first antenna provided to extend electrically from the circuit, and
a conductive layer provided on at least part of an outer peripheral surface of a main body forming a magnetism generation source, the conductive layer being not electrically continuous with the main body, wherein
the wireless tag includes a second antenna which relays electric waves transmitted and received by the first antenna, and the second antenna makes electrical contact with the conductive layer, and
the second antenna has a U-shaped cross section, and the first antenna is provided so as to be positioned on an inner periphery of the second antenna having the U-shaped cross section.

2. The magnetic marker according to claim 1, wherein the conductive layer is formed to have a loop shape on the outer peripheral surface of the main body.

3. The magnetic marker according to claim 2, wherein the wireless tag is arranged on an inner peripheral side of the loop shape formed by the conductive layer.

4. The magnetic marker according to claim 1, wherein the main body is a magnet formed by dispersing a magnetic powder, which is powder made of a magnetic material, in a non-conductive material forming a base material.

5. The magnetic marker according to claim 1, wherein the main body forms a columnar shape, and the conductive layer is formed on at least part of an end face of the columnar-shaped main body.

6. The magnetic marker according to claim 1, wherein the main body forms a columnar shape, and the conductive layer is formed on at least part of an outer peripheral side surface of the columnar-shaped main body.

7. A magnetic marker system comprising a magnetic marker laid in a road, wherein
the magnetic marker includes a wireless tag including a circuit which processes information transmitted and received by wireless communication and a first antenna provided to extend electrically from the circuit, and a conductive layer provided on at least part of an outer peripheral surface of a main body forming a magnetism generation source, the conductive layer being not electrically continuous with the main body, and
a buried section where magnetic markers are buried and a road-surface arrangement section where magnetic markers are arranged on the road surface are set to the road,
the magnet marker system comprising:
a reader device mounted on a vehicle to supply electric power to the wireless tag by wireless communication and read information transmitted from the wireless tag by wireless communication, wherein
the reader device has a frequency switching part which selectively sets any of a plurality types of carrier frequencies for transmitting the electric power by wireless communication, and switches the carrier frequency for transmitting the electric power by wireless communication according to whether the vehicle travels in the buried section or the road-surface arrangement section.

8. A magnetic marker system according to claim 7, wherein
the wireless tag includes a second antenna which relays electric waves transmitted and received by the first antenna, and the second antenna makes electrical contact with the conductive layer, and
the second antenna has a U-shaped cross section, and the first antenna is provided so as to be positioned on an inner periphery of the second antenna having the U-shaped cross section.

9. A magnetic marker system according to claim 8, wherein
the main body forms a columnar shape, and the conductive layer is formed on at least part of an outer peripheral side surface of the columnar-shaped main body.

10. A magnetic marker system according to claim 7, wherein
the conductive layer is formed to have a loop shape on the outer peripheral surface of the main body.

11. A magnetic marker system according to claim 10, wherein
the wireless tag is arranged on an inner peripheral side of the loop shape formed by the conductive layer.

12. A magnetic marker system according to claim 7, wherein
the main body is a magnet formed by dispersing a magnetic powder, which is powder made of a magnetic material, in a non-conductive material forming a base material.

13. A magnetic marker system according to claim 7, wherein
the main body forms a columnar shape, and the conductive layer is formed on at least part of an end face of the columnar-shaped main body.

14. The magnetic marker system according to claim 7, wherein the magnetic marker system includes a map database which stores information identifying whether the section is the buried section or the road-surface arrangement section, and the reader device switches the carrier frequency of supplying the electric power by wireless communication depending on information read from the map database, which identifies whether the section is the buried section or the road-surface arrangement section.

15. The magnetic marker system according to claim 7, wherein
the wireless tag retained by a head magnetic marker in the buried section and the road-surface arrangement section transmits code information indicating a head of each section.

16. A magnetic marker system comprising a magnetic marker laid in a road, wherein
the magnetic marker includes a wireless tag including a circuit which processes information transmitted and received by wireless communication and a first antenna provided to extend electrically from the circuit, and
a conductive layer provided on at least part of an outer peripheral surface of a main body forming a magnetism generation source, the conductive layer being not electrically continuous with the main body,
the wireless tag includes a second antenna which relays electric waves transmitted and received by the first antenna, and the second antenna makes electrical contact with the conductive layer, and
the second antenna has a U-shaped cross section, and the first antenna is provided so as to be positioned on an inner periphery of the second antenna having the U-shaped cross section.

17. The magnetic marker system according to claim 16, wherein
the system includes a reader device mounted on a vehicle to supply electric power to the wireless tag by wireless communication and read information transmitted from the wireless tag by wireless communication, and
the frequency specifications of electric waves transmitted from the wireless tag are different between the magnetic marker laid as being buried at a position deep from a road surface of the road and the magnetic marker laid as being arranged on the road surface.

* * * * *